United States Patent [19]

Young et al.

[11] 4,444,821

[45] Apr. 24, 1984

[54] VACUUM THERMAL INSULATION PANEL

[75] Inventors: James R. Young, Schenectady, N.Y.; Raymond M. Schreck, Louisville, Ky.

[73] Assignee: General Electric Company, Schenectady, N.Y.

[21] Appl. No.: 438,210

[22] Filed: Nov. 1, 1982

[51] Int. Cl.³ .................. B32B 1/04; B32B 7/02
[52] U.S. Cl. ...................... 428/69; 220/421; 220/450; 428/74; 428/75; 428/76; 428/285; 428/286; 428/920
[58] Field of Search .............. 428/69, 74, 75, 76, 428/285, 920, 286; 220/420, 421, 450; 105/357; 55/387, 389

[56] References Cited

U.S. PATENT DOCUMENTS

| | | | |
|---|---|---|---|
| 2,939,811 | 6/1960 | Dillon | 428/69 |
| 3,004,877 | 10/1961 | Simms et al. | 428/69 |
| 3,264,165 | 8/1966 | Stickel | 428/69 |
| 3,309,844 | 3/1967 | Hemstreet et al. | 55/389 |
| 3,936,553 | 2/1976 | Rowe | 428/69 |
| 4,172,915 | 10/1979 | Sheptak et al. | 428/69 |

*Primary Examiner*—Paul J. Thibodeau
*Attorney, Agent, or Firm*—William H. Steinberg; James C. Davis, Jr.; Marvin Snyder

[57] ABSTRACT

A vacuum thermal insulation panel comprises a pair of laminated plastic and aluminum sheets together with a plastic edge strip sealed to the edges of the sheets so as to define an evacuable volume in which a glass fiber mat is disposed. The insulation panel of the present invention takes advantage of the light-weight, low cost and low thermal conductivity of plastic materials to form an evacuable volume into which a glass fiber insulating mat is disposed for support of the panel which is evacuated to provide improved thermal insulation. Additionally, a gas permeation barrier is employed on the edge strip of the panel to minimize gas permeation at its edges. A metal foil layer provides gas permeation protection through the large surface areas of the sheets themselves.

9 Claims, 4 Drawing Figures

VACUUM THERMAL INSULATION PANEL

BACKGROUND OF THE DISCLOSURE

The present invention relates to thermal insulation panels and, in particular, to vacuum-based insulating systems.

The advantages of vacuum conditions for providing thermal insulation are well known. However, vacuum conditions are very hard to maintain in many insulating structures. Stainless steel has been employed in the past for construction of insulation panels. In particular, vacuum thermal insulation panels employing two mil thick stainless steel sheets between which glass fiber matting is placed have been disclosed in the past. However, the high cost of stainless steel, together with the problem of forming leak-tight edge seals using stainless steel, has generally discouraged the manufacture of stainless steel insulation panels.

It should be particularly noted that the insulation panels contemplated herein are typically approximately 3 feet square and about ½" thick. It is soon appreciated that, at an atmospheric pressure of 14.7 pounds per square inch, pressure loading on the walls of an evacuated insulation panel requires the employment of insulating filler material acting to support the panel walls against collapse due to atmospheric pressure. In such stainless steel panels, it is seen that the stainless steel walls function primarily to preserve interior vacuum conditions. The integrity of the panel is provided by the interior insulating material.

The vacuum level for vacuum insulation is not very stringent. In fact, an interior pressure of as high as 0.1 Torr (100 microns) may be employed satisfactorily. Accordingly, efforts have been made to employ plastic materials for the panel walls in place of the stainless steel walls. However, most gases permeate plastic. The permeation rate depends upon the specific gas and specific plastic. Most plastics have a higher permeation rate for water vapor than for other gases. Oxygen permeates less rapidly than water, while nitrogent and argon generally permeate at lower rates than oxygen. Since very few gases permeate metals, metals have been used as barrier layers on the plastic to reduce their permeation rates. However, metals are also generally highly thermally conductive, thereby generally negating their desirability for use in vacuum thermal insulation panels. In such panels, a low gas permeation rate is required to insure a sufficiently long life for the vacuum conditions.

For example, in a $3' \times 3' \times \frac{1}{2}"$ panel, there is a surface area of approximately $1.7 \times 10^4$ cm$^2$. If the permeation rate is distributed uniformly over the surface, and the maximum total permeation rate is $1.7 \times 10^{-9}$ Torr liters per second, a maximum permeation rate of $10^{-13}$ Torr liters per second per cm$^2$ is required from the panel walls to result in an interior pressure of less than 0.1 Torr for a 20 year panel lifetime. However, uncoated plastic films with a thickness of approximately 4 mils typically have permeation rates of about $10^{-8}$ Torr liters per second per cm$^2$ for air at atmospheric pressure and even higher permeation rates for water vapor.

Various manufacturers and individuals have disclosed gas permeation barriers for use with plastic films. For example, in U.S. Pat. No. 3,993,811, issued to W. F. Walles, there appears to be disclosed a method for applying a barrier layer to plastics so as to reduce the gas permeation rate. Additionally, American Can Company supplies an aluminum foil-plastic laminate consisting of sheets of 0.7 mil aluminum separated by plastic with a plastic exterior variously-described for example by catalog numbers E15484-78-B and E16287-79. While this material exhibits excellent permeation properties, the high thermal conductivity of aluminum significantly increases the rate of thermal loss along the edges, when such a material is employed by itself in a vacuum thermal insulating panel. Additionally, Dow Chemical Company, Inc. supplies plastic material (e.g., 4.5 mil thick polystyrene) treated chemically to provide a barrier for reduction of gas permeation. However, the permeation rates are still too high to provide sufficiently long-lived vacuum panels. Additionally, American Can Company also supplies gas permeation barrier coated plastic films made by evaporating a few hundred angstroms of aluminum onto plastic. However, these plastic materials do not meet the gas permeation requirements associated with long-lived vacuum preservation conditions. Lastly, other gas permeation barrier coated plastics, as supplied by E. I. duPont deNemours, Inc. have been examined, and have been found to exhibit gas permeation rates which are too high to meet long-lived vacuum insulating objectives.

Accordingly, it is seen that while many plastic film materials having low gas permeation characteristics or chemically-treated barriers have been developed, none are entirely suitable by themselves for the construction of thermally-insulating vacuum panels. However, the desirability for such panels is nonetheless still present. It should also be noted that while stainless steel panel walls are effective for achieving the objectives of low gas permeation, it is nonetheless an expensive material and exhibits certain edge sealing problems.

SUMMARY OF THE INVENTION

In accordance with a preferred embodiment of the present invention, a thermal insulation panel comprises first and second laminated panel walls, each wall sheet having at least two layers, one of which is plastic and the other of which is metal. The panels particularly include a plastic edge strip which is sealably joined to each of the panel walls along the edges of the wall so as to form an interior, evacuable volume which is filled with a glass fiber mat for panel support and insulation following evacuation. The interior volume also preferably includes getter material for absorbing atmospheric gases which may permeate the panel walls and edges. The advantages of the present invention are particularly achieved by the use of plastic edge strip material possessing a gas permeation barrier. This material is not employed in the panel walls themselves, because of its somewhat poorer gas permeation rates. However, the limitation of its use in the relatively narrow edge sealing strip between the panel walls significantly reduces the surface area of this material. The use of this edge strip significantly enhances the ability of the present invention to preserve interior vacuum conditions for acceptable periods of time, not only by providing a thermal barrier between the metal foil containing panel walls but also by exhibiting a very small surface area for the edge strip itself to minimize gas permeation through the edge strip. While the presence of metal such as aluminum in the panel walls is generally undesirable from thermal conductivity considerations, its presence nonetheless minimizes gas permeation and thus maximizes retention of vacuum conditions while its adjacent plastic layer or layers provide sufficient thermal insulation.

Moreover, the presence of metal within the panel walls is not a significant problem in the present invention because of the use of panel edge material solely comprising plastic having a nonmetallic gas permeation barrier layer. Additionally, the interior of the insulating panel of the present invention is preferably provided with a getter material such as zeolite or metallic barium to react with and reduce interior pressures which would otherwise result from the permeation of atmospheric gases such as oxygen, nitrogen, argon and water vapor.

Accordingly, it is an object of the present invention to provide a light-weight, inexpensive vacuum thermal insulation panel.

It is also an object of the present invention to provide a vacuum thermal insulation panel essentially comprising plastic film materials as the panel walls.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
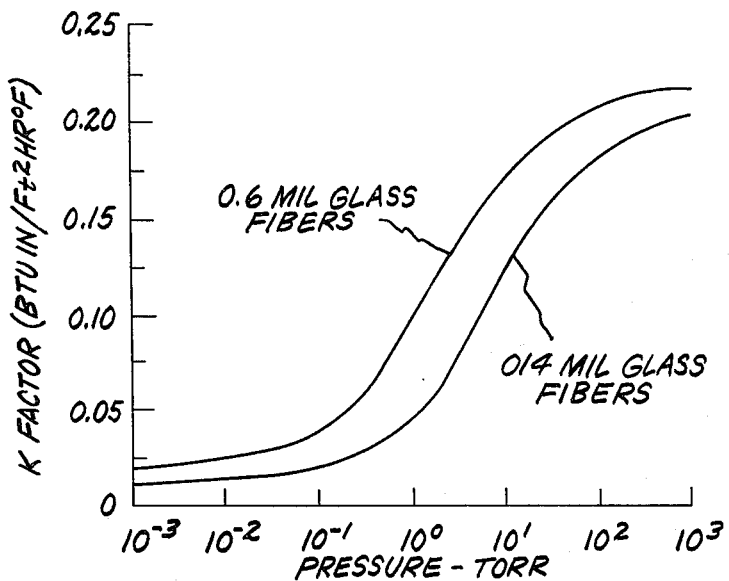
FIG. 1 is a graph of K factor versus pressure for two forms of glass fiber insulation.

FIG. 1 is a plot of thermal conductivity, that is, K factor, as a function of pressure for glass fiber filled flat panel vacuum insulation. The K factor for two different glass fiber diameters are shown, namely, 0.6 mil glass fiber and 0.14 mil glass fiber. The significant feature of this pair of curves is the fact that, at pressures below 0.1 Torr, variations in pressure do not significantly effect the thermal conductivity of the vacuum insulating panel. Accordingly, the graphs suggest that a pressure of 0.1 Torr is an adequate design pressure for measuring the effective life of a vacuum insulation panel. In particular, in a panel that employs wall material comprising a gas-permeable plastic, it is seen that it is desirable to maintain the internal pressure below 0.1 Torr for as long a time as possible to maintain its insulating capabilities. FIG. 1 also suggests that it is preferable to employ glass fibers having small diameters. In particular, it is seen that glass fibers having a diameter of 0.14 mils is preferable to the use of glass fibers having a diameter of 0.6 mils. The data from this Figure has been previously published in an article by Strong, Bundy, and Bovenkerk in the *Journal of Applied Physics*, Vol. 31, page 39, 1960.

Figure 2:
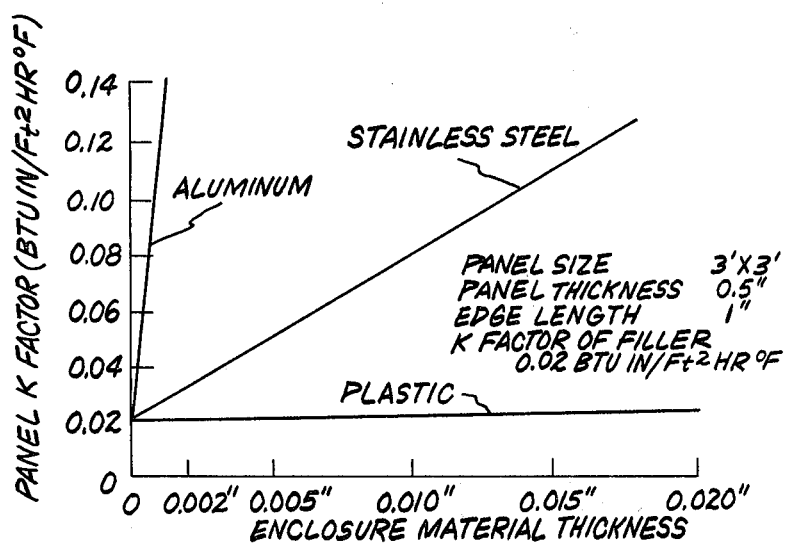
FIG. 2 is a graph of panel K factor versus material thickness for aluminum, stainless steel and plastic.

FIG. 2 is a graph of panel K factor versus enclosure material thickness for three different materials, namely, aluminum, stainless steel and plastic. The panel being considered in the curves of FIG. 2 is a 3'×3' panel having a thickness of 0.5" with an edge length of 1". The edge length includes the panel thickness plus the width of the edge seals along each panel wall. In each case, the K factor for the filler material employed was 0.02 BTU-in/ft$^2$-hr-°F. The curves in this graph clearly indicate the high thermal conductivity factors associated with metal panel walls, and, in particular, with panel walls comprising aluminum. For this reason, the use of aluminum in vacuum thermal insulation panels has not been recommended. Nonetheless, FIG. 2 does suggest the desirability of employing plastic materials in panel walls. However, as mentioned above, plastic materials exhibit gas permeation characteristics which tend to permit an increase in the internal panel pressure over a period of time as atmospheric gases permeate the material. However, in experiments conducted by one of the present inventors, it has been found that an aluminum-foil/plastic-laminate as supplied by the American Can Company in which the aluminum layer has a thickness as low as 0.7 mils, has been found to permit no detectable permeation by oxygen, nitrogen, argon or water vapor. This laminate comprises two sheets of 0.7 mil aluminum foil separated by plastic with a plastic coating on the exterior. This material is satisfactory for vacuum panel insulation walls except for the high conductivity of the aluminum. However, the unique structure of the present invention eliminates the problem of aluminum conductivity by employing an edge strip possessing a nonmetallic gas permeation barrier coating. In this regard, a vacuum thermal insulating panel in accordance with applicants' invention is illustrated in FIG. 3 which is discussed below.

Figure 3:
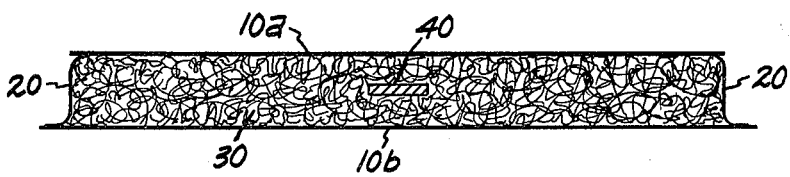
FIG. 3 is a cross-sectional side elevation view of a vacuum thermal insulating panel constructed in accordance with the present invention.

In FIG. 3, it is seen that a vacuum thermal insulating panel comprises panel wall members 10a and 10b. These panel walls preferably comprise an aluminum-foil/plastic-laminate material. However, it is possible to employ wholly metal panel walls. The principal function of the panel walls is to act as a permeation barrier to atmospheric gases. Each panel wall 10a and 10b has approximately the same dimension, and, for example, may, in fact, comprise sheets which are approximately 3 feet on each side. An edge sealing strip 20 is sealably joined to each of the panel wall members along the wall edges so as to define an evacuable internal volume. For structural integrity and thermal insulation, this volume is filled with an insulation material such as glass fiber mat 30. The mat not only functions to provide insulation but also to maintain the two panel walls in a spaced apart relationship. The construction of the panel illustrated in FIG. 3 provides a minimal area for the barrier layer plastic edge strip by employing it only in the edge strip 20. This reduces the area of this material by a factor of about 40. Because of the relative ease of sealing plastic to plastic, in a preferred embodiment of the present invention, the panel walls 10a and 10b preferably possess plastic layers facing the interior of the vacuum panel. Evacuation of the panel is accomplished through a conventional tubulation point which, after evacuation, is preferably heat-sealed and coated with an additional gas permeation barrier. The tubulation for evacuation is typically disposed at any convenient location along edge strip 20.

Because of gas permeation occurring almost exclusively through plastic edge strip 20, it is highly desirable in the present invention to employ gettering material 40 within the interior volume of the panel. In particular, activated zeolite is capable of absorbing large quantities of water. Only five grams of active zeolite are required to remove all of the water vapor that permeates the panel over periods as long as 20 years. Additionally, gettering materials for other atmospheric gases may be used to remove these pressure-contributing species as well. In particular, metallic barium may be employed to getter $O_2$ and $N_2$. If a metal getter such as barium is employed, it may take as long as 48 years for the internal gas pressure of the vacuum panel of the present invention to reach an interior pressure of 0.1 Torr. However, in choosing the amount of barium, consideration should also be given to the fact that barium also absorbs a certain amount of water vapor. Thus, the combination of barium and zeolite as getter materials in the same panel requires sufficient barium to getter some water vapor also. In particular, it has been calculated that approximately 60 grams of barium are sufficient for an insulating panel having a life of about 20 years. Moreover, if barium and Zeolite ® are both employed as gettering materials within the vacuum insulating panel, it is preferred that they be disposed in different locations therein.

Figure 4:
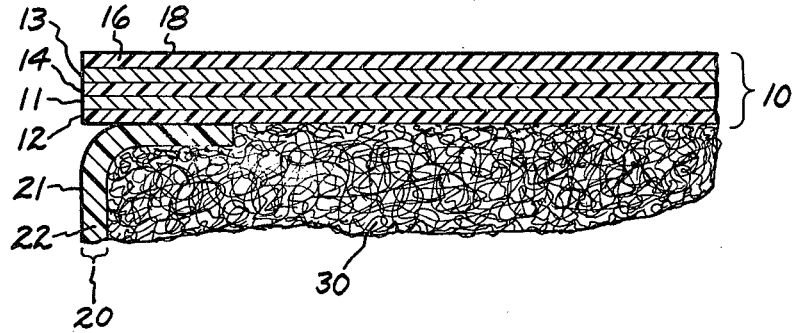
FIG. 4 is a partial cross-sectional view of a small corner portion of the insulating panel shown in FIG. 3.

A more detailed illustration of the construction of the present invention is illustrated in FIG. 4. In this Figure, it is seen that vacuum panel wall 10 comprises a multilayered structure in which layers 11 and 13 of metallic foil such as aluminum are sandwiched between layers 12, 14 and 16 of a plastic material, which is preferably resistant to the permeation of atmospheric gases. In particular, exterior plastic layer 16 preferably includes a special gas permeation barrier coating 18, such as may be provided by chemical treatment. Panel wall structure 10 is particularly resistant to gas permeation in a direction perpendicular to its surface. Nonetheless, some gas permeation may occur through the edges of the material, particularly in layer 12. Panel wall 10 may also comprise structures other than those which are specifically illustrated in FIG. 4. However, in particular, panel wall 10 should preferably include at least one plastic layer, and one metal foil layer. However, because of gas permeation through the edges of the material, it has been found by the instant inventors that the mere repetition of layered structure does not significantly add to reduction in gas permeation much beyond the use of layers illustrated in FIG. 4.

FIG. 4 also illustrates the fact that interior layer 12 is preferably plastic so that it may be easily heat sealably joined to plastic of edge strip 20. Edge strip 20 preferably comprises plastic layer 22 which is resistant to gas permeation, together with a gas permeation barrier 21, which unlike the barrier in wall member 10, is preferably nonmetallic or if there is any metallic content in barrier 21 it is so disposed therein so as not to exhibit high thermal conductivity. Since edge strip 20, together with mat 30, maintains panel walls 10a and 10b at different temperatures, the presence of aluminum or other metallic layers 11 and 13 in wall members 10 does not contribute to increased rates of heat loss across the panel. Additionally, shown in FIG. 4 is glass fiber mat 30.

It should also be noted that the selection of a panel thickness of about 0.5" is a significant factor in the design of specific vacuum insulating panels in accordance with the present invention. In particular, if a panel thickness greater than about 0.5" is employed, this increases the area of edge strip 20 which is the primary source of gas permeation and interior pressure increases. However, increased panel thickness is nonetheless generally desirable to reduce the rate of heat loss. Thus, the panel thickness is an important design choice.

From the above, it may be appreciated that the vacuum thermal insulating panel of the present invention exhibits significantly improved cost and manufacturing benefits over previously-employed flat panel vacuum thermal insulation using stainless steel as a panel wall material. Furthermore, the insulating panel of the present invention provides walls which are substantially gas impermeable. Even though the panel walls of the present invention contain a metallic foil, the problems associated with the high conductivity of such a material is obviated in the instant invention by the employment of a wholly plastic edge strip which is appropriately sized to ensure that it exhibits a minimal area for gas permeation and yet, at the same time, provides sufficient thickness for the vacuum panel to function properly. Furthermore, it is seen that the problems of gas permeation which may result from the presence of the plastic edge strip, are nonetheless compensated by the use of gettering materials for atmospheric gases.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A thermal insulation panel comprising:
    a first panel wall comprising a laminated structure of plastic and metal foil, said metal foil layer at least 0.7 mils thick, said first wall being substantially impermeable to atmospheric gases;
    a second panel wall comprising a laminated structure of plastic and metal foil, said metal foil layer at least 0.7 mils thick, said second wall also being substantially impermeable to atmospheric gases, said first and second panel walls having approximately the same dimensions;
    a plastic edge strip without metal foil, sealably joined to each of said first and second panel walls along the edges of said walls, said edge strip possessing a gas permeation barrier coating, the space between said edge strip and said panel walls being evacuated; and
    an insulation material disposed within said volume and functioning to maintain such panel walls in a spaced apart relation under vacuum conditions within said volume.

2. The insulation panel of claim 1 in which said first and second panel walls each comprise a layer of aluminum between two layers of plastic.

3. The insulation panel of claim 2 further including a gas permeation barrier disposed on exterior plastic layers of said panel walls.

4. The insulation panel of claim 1 further including gettering material for water vapor disposed within said evacuable volume.

5. The insulation panel of claim 1 further including gettering material comprising barium.

6. The insulation panel of claim 1 in which said metal foil comprises aluminum.

7. The insulation panel of claim 1 in which said plastic layers in said panel wall comprise a low gas permeation plastic material.

8. The insulation panel of claim 1 in which said first and second panel walls each comprise two layers of aluminum interleaved by three layers of plastic.

9. The insulation panel of claim 1 in which said insulation material comprises glass fibers.

* * * * *